United States Patent [19]

Del Bianco et al.

[11] 4,377,434

[45] Mar. 22, 1983

[54] ROLLER DRIVE FOR AN APPARATUS FOR AUTOMATICALLY LAMINATING CIRCUIT BOARDS

[75] Inventors: Matthew A. Del Bianco, Chesapeake Isle, North East, Md.; Henry J. Tancredi, Gwynedd, Pa.

[73] Assignee: E. I. Du Pont de Nemours and Company, Wilmington, Del.

[21] Appl. No.: 235,415

[22] Filed: Feb. 17, 1981

[51] Int. Cl.³ .............................................. B65C 9/40
[52] U.S. Cl. ................................... 156/364; 156/522; 156/552; 198/624
[58] Field of Search ............... 226/168, 174, 176, 182, 226/184, 186; 271/266, 273, 274, 250; 198/624, 840, 842; 156/555, 538, 556, 364, 552

[56] References Cited

U.S. PATENT DOCUMENTS 746,145 12/1903 Perky .................................. 198/624
3,674,590 7/1972 Holman ........................... 156/522 X

*Primary Examiner*—David A. Simmons

[57] ABSTRACT

A conveyance arrangement for conveying planar circuit boards is characterized by a roller drive in which the individual rollers have an angled driving surface formed thereon. The angularity of the driving surface is selected such that when the surface engages the edge thickness of a circuit board the board, if otherwise unrestrained, is displaced at a predetermined rectilinear velocity. However, if the board is restrained, the driving surface slips with respect to the edge of the board.

22 Claims, 12 Drawing Figures

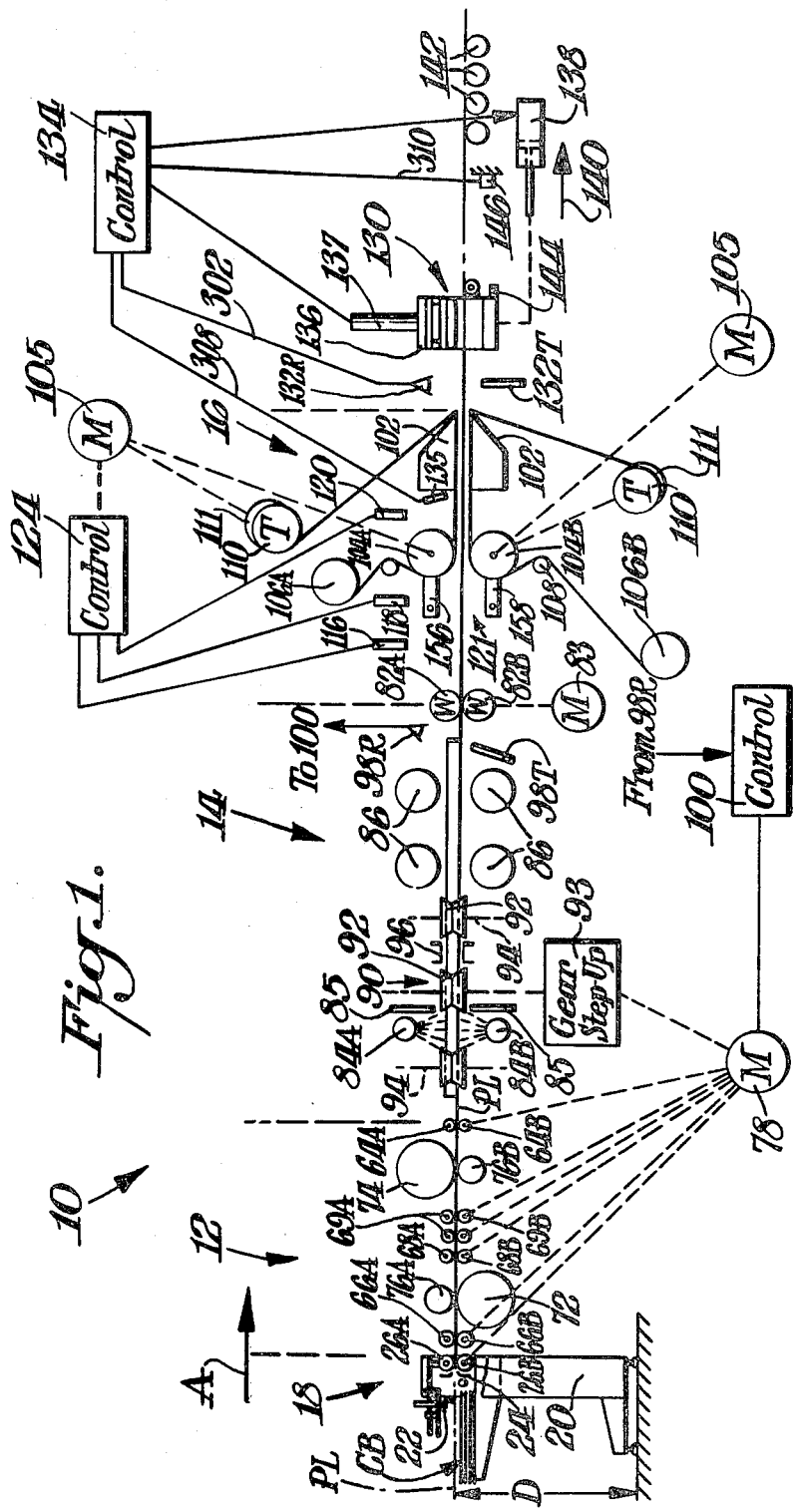

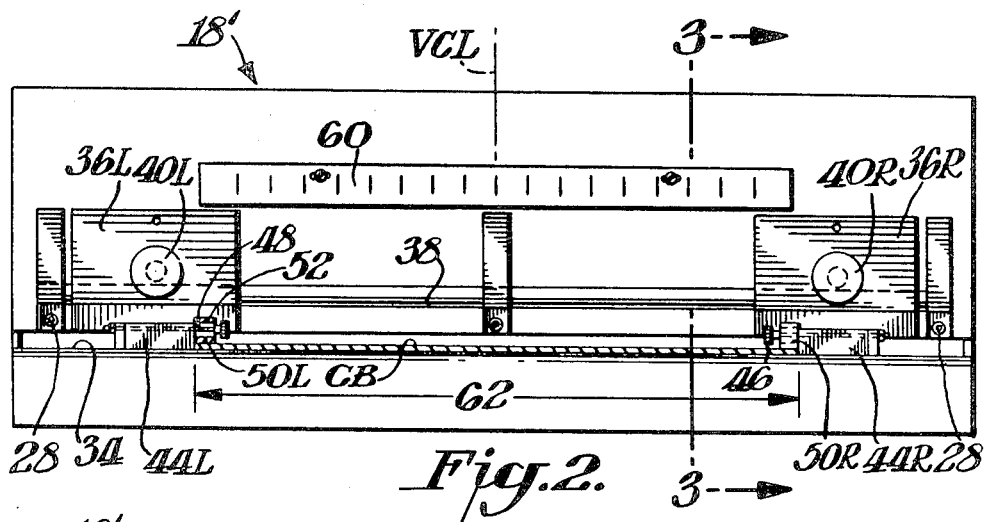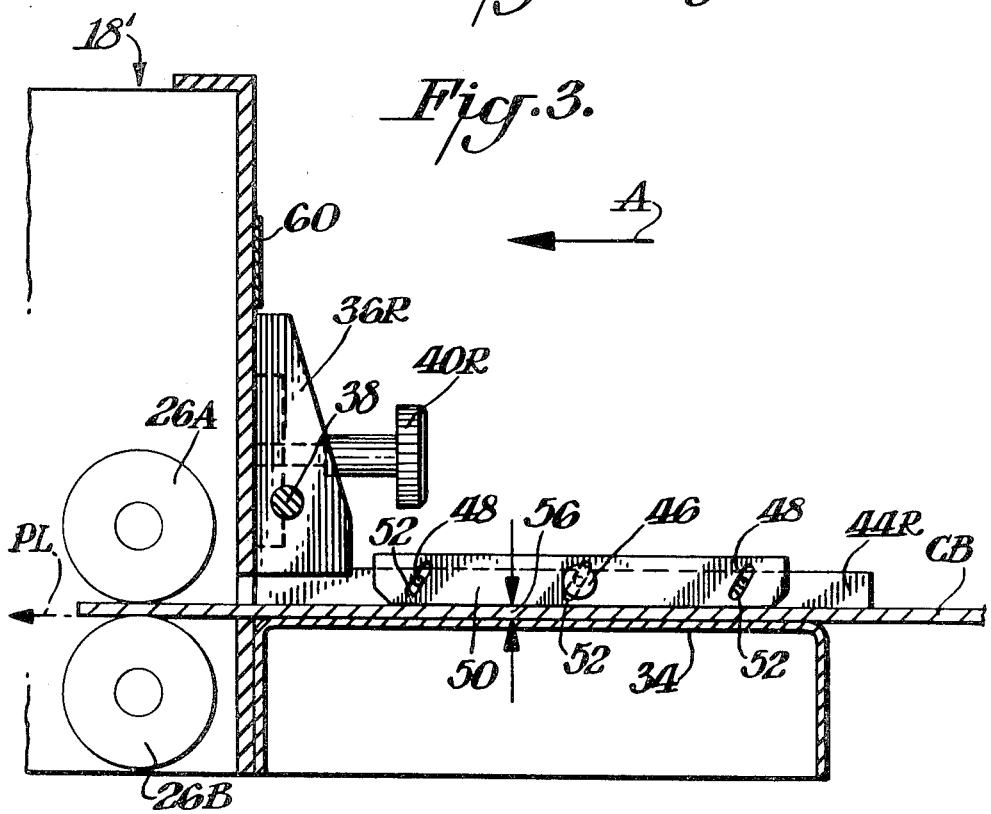

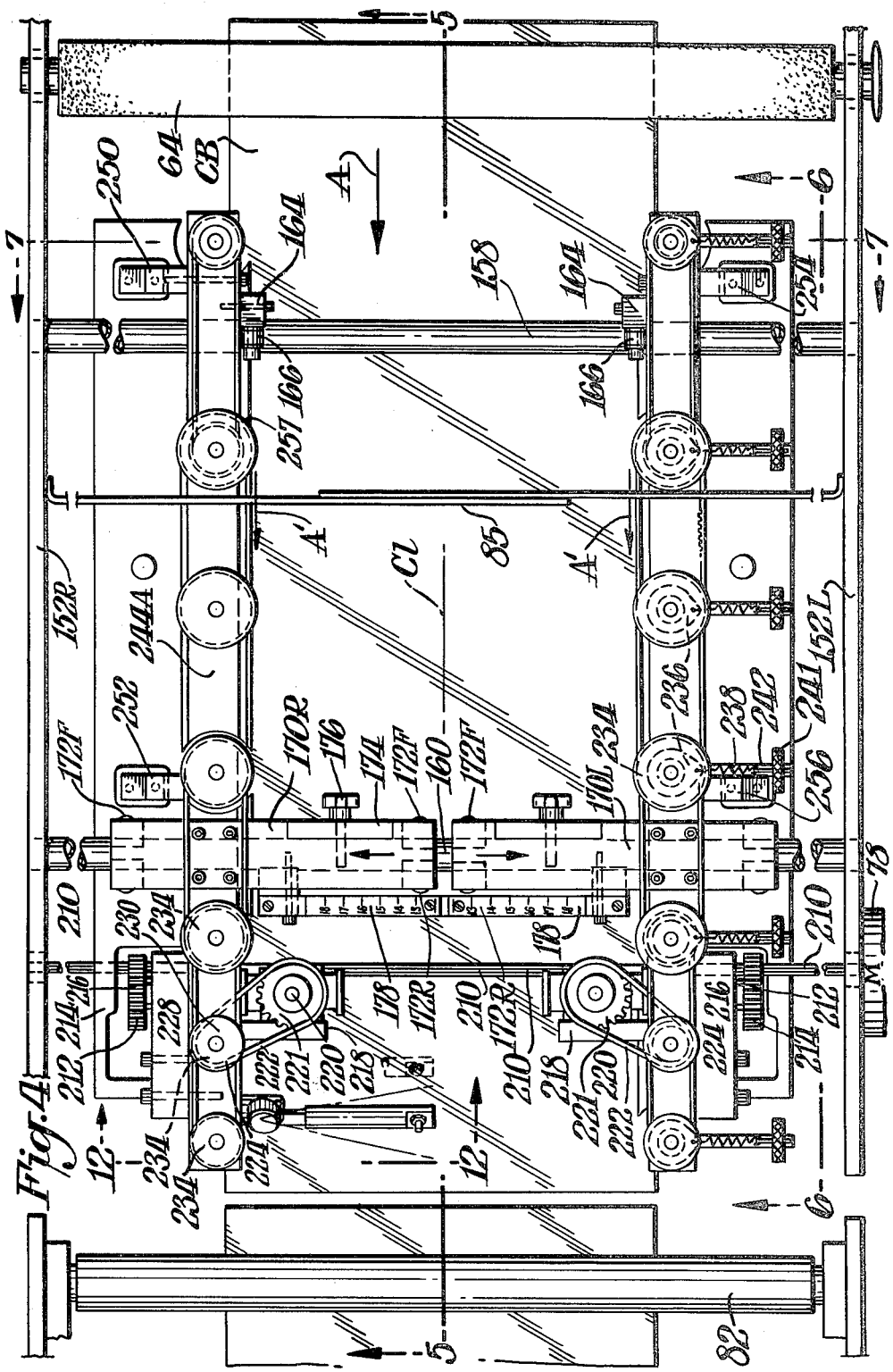

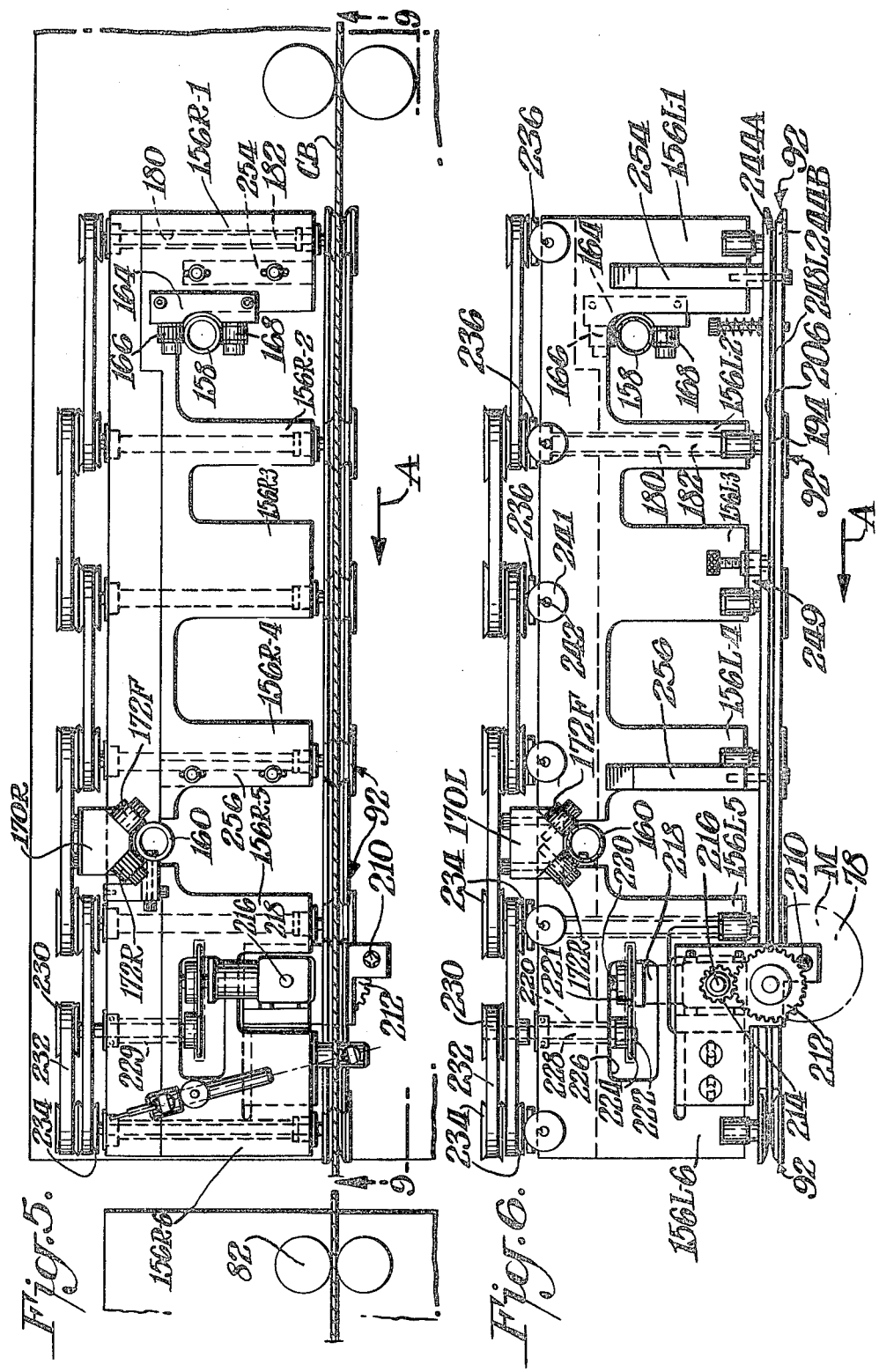

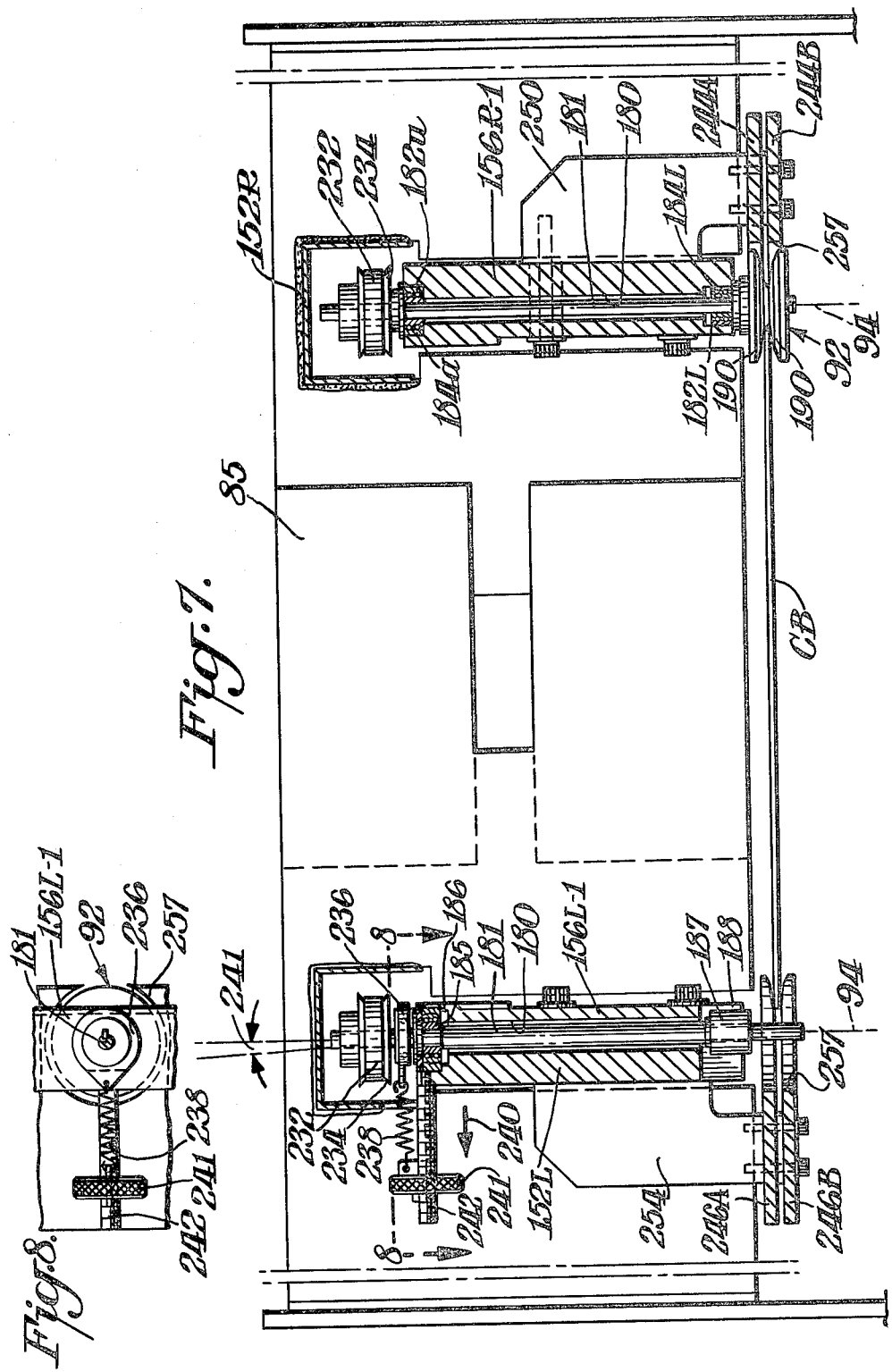

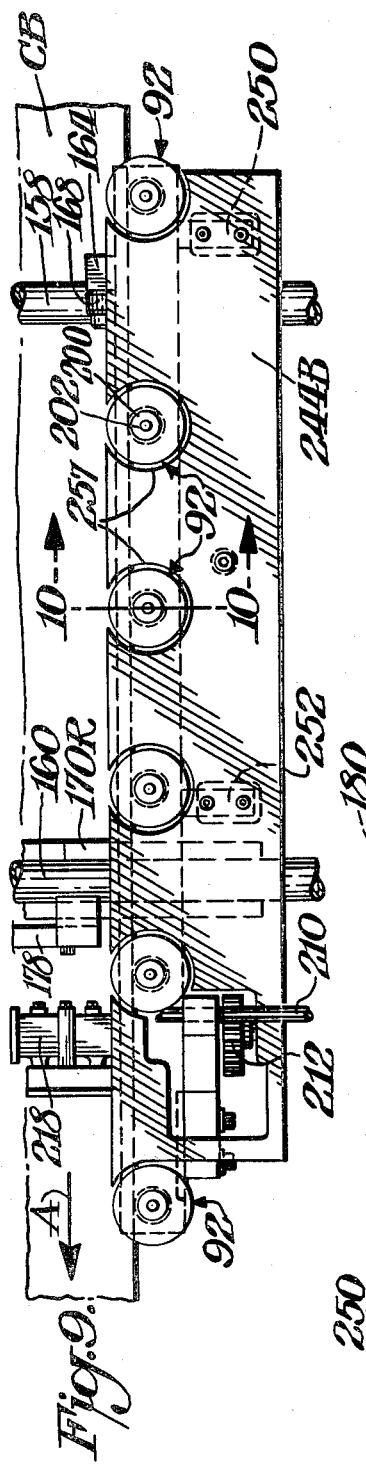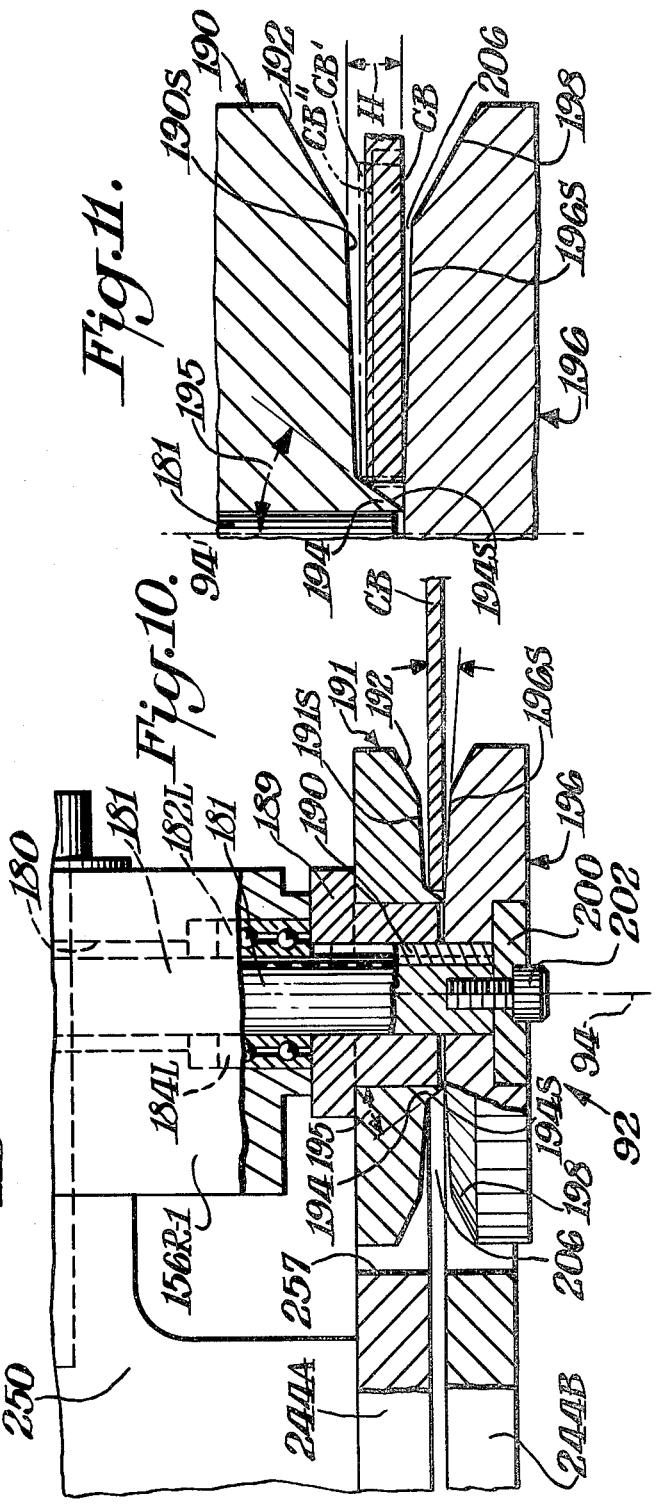

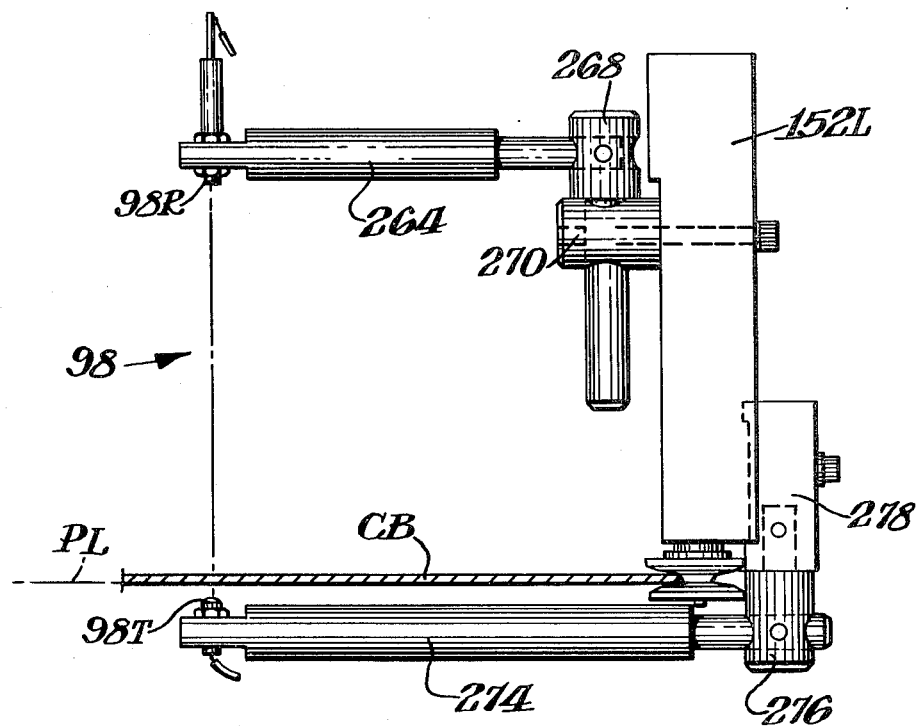

ROLLER DRIVE FOR AN APPARATUS FOR AUTOMATICALLY LAMINATING CIRCUIT BOARDS

FIELD OF THE INVENTION

This invention relates to a conveyance arrangement useful with an apparatus for automatically laminating circuit boards with a dry film photopolymer resist material and, in particular, to a roller drive adapted to rectilinearly displace boards through a region of the apparatus at a predetermined velocity.

BACKGROUND ART

When using a dry film photopolymer resist material, such as that manufactured by E. I. du Pont de Nemours and Company, Inc. and sold under the trademark RISTON ®, it is necessary to laminate a layer of that material onto the surface of a circuit board or other substrate prefatory to exposure by actinic radiation. Typically, the layer of photopolymer resist material is laid over the surface of the substrate to be covered and the substrate and resist passed between the nip of heated laminating rolls. The surface of the substrate may be previously scrubbed to remove oxide layers and other contaminants therefrom. The scrubbing assists in the adhesion of the resist material to the substrate. If done manually, the preparation of the substrate and the introduction and removal thereof into and from the laminating rolls is time consuming and expensive.

It is advantageous to increase the throughput of the laminating operation by providing an apparatus adapted to automatically prepare the surface of the substrate, convey the prepared substrate to the lamination region which contains the heated laminating rolls, and thereafter remove laminated boards from the apparatus for further fabrication. However, in any automated apparatus certain minimum requirements are believed necessary in order to most efficiently and effectively laminate a resist layer to the surface of a substrate.

For example, if copper coated boards are to be laminated with a resist material, it is believed to be advantageous to utilize a conveyance arrangement which expeditiously translates the board from the region in which the surface thereof is scrubbed to the region in which the board is laminated in order to minimize the oxidation of the surface of the substrate to the fullest extent possible.

To avoid wastage of resist material, it is also desirable that individual boards be presented to the laminating rolls with as little a gap as possible between a give board and a trailing board. Thus, any conveyance arrangement should be adapted to avoid cumulative gapping between successive boards introduced into the lamination region. It is believed to be most desirable to provide a conveyance arrangement wherein successive boards are in an abutted relationship (tail-to-head) at the time one of the boards is introduced into the laminating rolls. Moreover, any conveyance arrangement should be able to maintain abutment between successive boards without regard to variations in board length from run to run. Since the boards being laminated are relatively thin planar members, it is also necessary that any conveyance arrangement be adapted to prevent board overlap. That is, the leading edge of a trailing board must not extend over or under the trailing edge of a leading board. Such an occurrence can potentially render inutile both boards.

In the lamination region itself, it is believed desirable to provide a mechanism whereby the laminating rolls are accurately brought into contact with the leading edge of a leading board in a run and (assuming the boards are butted) removed from contact as the trailing edge of the last trailing board exits the laminating rolls. Such a practice is advantageous in that it avoids wastage of resist material. Moreover, the laminating rolls should be susceptible to accurate opening and closing motions which would bring the rollers into contact with the surfaces of the board and predictably impart a predetermined pressure force to the board to laminate the resist layer thereto. The gap, or nip, formed between the rollers when the rollers are closed should, moreover, be predictably adjustable.

Once the board and resist material have been laminated, the laminate (i.e., substrate and resist layer adhered thereto) so formed should be automatically removable from the apparatus. With those resist materials which are provided with a backing strip the laminate may be moved through the apparatus incidentally to the take-up of the backing strip. When the backing strip is being taken-up, care must be exercised that proper tension is maintained on the strip. It is therefore believed advantageous to provide a slip clutch tension device to insure that the take-up tension force exerted by a take-up roller on the backing strip be held within appropriate limits.

While any portion of the laminate is still within the apparatus the laminate is subjected to a restraining force which tends to resist any displacing force imposed on the laminate to assist in its withdrawal from the apparatus. However, when laminate is drawn through the automated apparatus it is desirable to provide a structural arrangement whereby the laminate is separated from the backing strip and any unadhered resist present between the trailing edge of the laminate and the leading edge of the next-successive laminate. Accordingly, it is believed advantageous to provide a gripping arrangement adapted to grasp the laminate when a predetermined portion thereof has exited from the apparatus and to exert a force on the laminate which pulls it free from the trailing resist material when the backing strip is completely removed from the laminate.

SUMMARY OF THE INVENTION

The instant invention relates to a conveyance arrangement including a roller drive for an automated circuit board laminating apparatus.

The roller drive in accordance with the instant invention is operative to translate individual circuit boards through a region typically defined from the outlet of a scrubbing region to the inlet of the laminating region. The dimension of the region (measured in the direction of board travel) is in excess of the dimension of the largest board measured in the same direction. The inlet and outlet of the region in which the conveyance arrangement is disposed are typically, but not necessarily, defined by nip rollers. The roller drive is adapted to rectilinearly translate individual boards, if otherwise unrestrained, from the inlet to the outlet of the region at a predetermined velocity in excess of the velocity at which the boards enter into the laminating region. In this manner individual boards are brought into the desired abutting relationship prior to their entry into the laminating region. However, if an individual board is restrained at either the inlet or the outlet of the region, the roller drive is arranged so as to slip against the edges of the individual boards until the board is unrestrained.

The roller drive in accordance with the instant invention includes a roller having a peripheral slot therein arranged to engage the edge thickness of the individual circuit boards. The base of the slot includes a drive surface inclined at a predetermined angle in a range from 30° to 60° with respect to the axis of rotation of the roller. The most preferred angle is 45°. Because of the angularity of the drive surface, boards within a predetermined range of thicknesses can be accommodated by the roller. Means are provided for rotating the roller at a predetermined angular velocity. The angle of the surface is arranged such that when the board is restrained the drive surface of the roller slips with respect to the edge of the board. However, when the board is otherwise unrestrained the drive surface of the roller engages the board to displace it at a predetermined rectilinear velocity through the region in which the roller is disposed.

The rollers are disposed most preferably in pairs, each roller in the pair being located on opposed sides of the board being conveyed. The rollers in the pair are rotated co-currently such that the rollers cooperate to displace a board from the inlet of the region to the outlet.

A pair of plates defining a slot are disposed adjacent to each roller, the slot defined by the plates being in registration with the peripheral slot in the roller to which the plates are adjacent. The slots in the plates and in the periphery of the roller assist in preventing overlap of boards as the boards are conveyed through the region.

In order to prevent gapping a sensor is provided to detect gaps between adjacent boards and to generate a signal representative of that fact. The roller drive is responsive to that signal to increase the angular velocity at which the rollers are rotated and, hence, the velocity at which boards are rectilinearly displaced through the region.

BRIEF DESCRIPTION OF THE DRAWINGS

The invention will be more fully understood from the following detailed description thereof, taken in connection with the accompanying drawings, which form a part of this application and in which:

FIG. 1 is a stylized schematic representation of an apparatus for automatically laminating a circuit board with which the instant invention is utilized;

FIGS. 2 and 3 are a front elevation view and a side section view, respectively, of an alternate in-feed arrangement;

FIG. 4 is a plan view of the conveyance arrangement of the instant invention;

FIGS. 5, 6 and 7 are section views respectively taken along section lines 5—5, 6—6 and 7—7 in FIG. 4;

FIG. 8 is a section view taken along section lines 8—8 in FIG. 7;

FIG. 9 is a bottom plan view of a portion of the roller drive used in the conveyance arrangement of the instant invention;

FIG. 10 is a section view of an individual roller taken along section lines 10—10 in FIG. 9;

FIG. 11 is an expanded view showing the interaction of an individual roller and a circuit board driven thereby; and FIG. 12 is a view taken along view lines 12—12 in FIG. 4 showing the mounting structure for a sensor used in the conveyance arrangement of the instant invention.

DETAILED DESCRIPTION OF THE INVENTION

Throughout the following detailed description similar reference numerals refer to similar elements in all Figures of the drawings.

FIG. 1 is a highly stylized schematic representation of an apparatus 10 for automatically laminating individual circuit boards CB with a dry film photopolymer resist material such as that sold by E. I. du Pont de Nemours and Company, Inc. under the trademark RISTON ®. The individual circuit boards CB able to be handled by the apparatus 10 in accordance with this invention are typically planar members having planar width dimensions ranging from twelve to eighteen inches and planar length dimensions ranging from fourteen to twenty-four inches. Individual circuit boards CB may have a thickness dimension in a range from 0.030 inches to 0.125 inches. The boards CB form the substrate upon which a layer of the resist material may be laminated to the upper surface, the lower surface or both surfaces of the board CB. The boards CB may be fabricated of a single copper plate or may themselves be laminates of several intermediate plates (commonly called "inner layers") with the upper and lower surfaces of the boards CB being copper.

The apparatus 10 is an integrated device which is able to perform each of the functions necessary to prepare an individual circuit board CB for the application of a dry film photopolymer resist material and to apply the resist material thereto. The apparatus 10 includes a brush cleaning region 12 (hereafter the "cleaning section"), a rinse and air-dry region 14 (hereafter the "rinsing section"), and a lamination region 16 (hereafter the "laminating section"). Individual circuit boards CB are introduced into the cleaning section 12 of the apparatus 10 by an in-feed arrangement 18.

The in-feed arrangement 18 includes a frame 20 having a pneumatic carrying element 22 mounted thereon. Individual circuit boards CB are lifted from a supply of boards and carried by the carrying element 22 to a lead-in guide 24 terminating at the nip of an inlet pair of nip rollers 26 disposed at the inlet of the cleaning section 12.

Alternatively, individual circuit boards CB may be manually fed into the apparatus 10 through an in-feed arrangement 18' shown in FIGS. 2 and 3. The in-feed arrangement 18' is attachable to the front of the apparatus 10 by any suitable means, as by screws 28. The in-feed arrangement 18' includes a planar tray 34 having laterally adjustable guides 36L and 36R movably disposed along a fixed guide shaft 38. The guides 36 are supportable in a fixed location along the shaft 38 by lock nuts 40. Each guide 36 includes a forwardly projecting arm 44 having a lug 46 and guide pins 48 extending therefrom in a confrontational relationship with the lug 46 and the pins 48 on the opposite arm 44. A runner 50 having inclined slots 52 therein is received on the lug 48 and guide pins 50 extending from each of the arms 44. The runners 50 slide in the slots 52 with respect to the lug 46 and pins 48 to increase or decrease the vertical dimension 56 of an in-feed slot defined between the lower surface of the runners 50 and the upper surface of the planar tray 34. By limiting the vertical dimension 56 of the in-feed slot it is possible for an operator to insert only a single board CB into the apparatus 10 at any given time. Because of the thickness limitation of the in-feed slot, circuit boards CB may only be serially introduced into the inlet nip rollers 26 of the apparatus 10, thus preventing overlap of boards.

The spacing 62 defined between the confronting portions of the arms 44 serves to channelize the circuit boards CB into a path of travel symmetrical about the vertical centerline VCL extending through the apparatus 10. The transverse dimension of the spacing 62 between the arms 44 is indicated by an indicia 60. The transverse dimension of the path of travel is adjustable to correspond to the planar width dimension of the boards CB being laminated. The individual circuit boards CB are conveyed through the apparatus 10 along a pass line PL (FIG. 1). The pass line PL is an imaginary horizontal line extending from the inlet to the outlet of the apparatus along which the lower surface of a board CB is conveyed as the board moves through the various regions of the apparatus. The pass line PL may be defined as a line extending through the apparatus 10 that lies a predetermined fixed distance D from a predetermined reference datum, as the floor of the workspace on which the apparatus is disposed. Hereafter, the pass line PL shall serve as a vertical reference datum for locating structural elements within the apparatus 10 as being either thereabove or therebelow. The vertical centerline VCL through the apparatus 10 shall serve a horizontal reference datum for locating structural elements as being either right or left as viewed from the in-feed end of the apparatus 10 (FIG. 2). Circuit boards CB are conveyed along the pass line PL in a path of travel in the direction of arrow A (FIG. 1) extending from the in-feed end of the apparatus, through the cleaning section 12, the rinsing section 14, to the outlet of the laminating section 16.

The cleaning section 12 is defined between the inlet pair of nip rollers 26A and 26B (respectively above and below the pass line PL) and a second, outlet, pair of nip rollers 64A and 64B. Intermediate pairs of nip rollers 66A and 66B, 68A and 68B and 69A and 69B are disposed within the cleaning section 12 and cooperate with the rollers 26 and 64 to define a conveyor by which circuit boards CB are transported through the cleaning section 12 along the pass line PL. Intermediate between the nip rollers 66 and 68 is a lower surface brush scrubber 72 while an upper surface brush scrubber 74 is disposed between the nip rollers 64 and 69. The brush scrubber 72 is located below the pass line PL while the brush scrubber 74 is disposed above the pass line PL. Each scrubber acts against an associated backup roller 76A and 76B, respectively. The nip rollers 26, 64, 66, 68 and 69 are driven by a drive motor 78 appropriately geared such that circuit boards CB are passed through the cleaning section 12 at a first predetermined linear speed (typically eight linear feet per minute). It is at this speed that boards CB exiting the cleaning section 12 enter the adjacent rinsing section 14 through the nip rollers 64A and 64B. In the cleaning section 12 the abrasive action of the nylon bristle brushes with silica carbide inserts on the scrubbers 72 and 74 respectively remove oxide and a thin layer of material from both the lower and upper surfaces of the board CB. The scrubbers 72 and 74 are rotated by a drive motor (not shown) and are also movable with respect to the vertical center line VCL of the apparatus 10. This transverse motion of the brush scrubbers assists their removal of the thin layer of material from the surface of the circuit board CB. Suitable for use as the cleaning section 12 is a Surface Finisher sold by Chemcut, Inc. of State College, Pennsylvania under Model No. 107. Of course any other suitable surface cleaner may be utilized.

Between the pair of nip rollers 64 at the exit of the cleaning section 12 and a pair of wetting rolls 82 lies the rinsing section 14. In this section the now-scrubbed surfaces of the circuit boards CB are rinsed by the application of a water spray from nozzles 84A and 84B arranged above and below the pass line PL, respectively. Suitable baffles 85 are provided to prevent water from leaving the portion of the rinsing section in the vicinity of the nozzles 84. The boards CB are air dried by streams of air directed theretoward from an array 86 of air knives. The rinsing and air-dry procedure removes copper fines and other extraneous matter from the scrubbed surfaces of the boards preparatory to the introduction of the boards to the laminating section 16.

The wetting rolls 82 contain an inner core formed of a hollow stainless steel rod having radially extending slots therethrough. Wetting solution is introduced to the interior of the core through rotary unions which also act as trunnions to support the wetting rolls 82 in the frame of the apparatus 10. Disposed around the exterior of the core is an outer layer of porous polyethylene. This layer is covered by a fabric sock outer covering. The polyethylene layer and outer fabric sock meter the wetting solution onto the surface of the boards. The wetting rolls 82 are connected to a drive motor 83 and are preferably driven at the same linear speed as nip rollers 64.

The boards CB are conveyed through the rinsing section 14 by a conveyance arrangement including a V-roller drive 90 in accordance with the instant invention. The drive 90 is discussed in full detail herein. The V-roller drive includes an array of roller elements 92 which rotate on axes 94 perpendicular to the pass line PL. As is set forth herein, the rollers 92 have a peripheral slot therein which receives the lateral edges of each board CB and guides the edges of the boards CB into contact with a driving surface disposed at the base of the slot. The driving surface defines a predetermined friction angle with the axis 94 of the roller. The rollers 92 drive each circuit board CB from the nips 64 to the wetting rolls 82. The V-roller drive 90 translates an otherwise unrestrained board CB at a speed greater than the linear speed at which the board is driven while under the influence of either the nip rollers 64 or the wetting rolls 82. However, whenever a board is restrained (by either the nip rollers 64 or otherwise) the same friction angle allows the rollers 92 to slip against the edge of the board. As used herein, "unrestrained" connotes that the board CB is under the influence of the V-roller drive 90 and may be displaced at the velocity imparted thereto by the drive 90. The term "restrained" connotes that the board is moved under the influence of the nip rollers at the velocity thereof, or is otherwise constrained to displace at a velocity less than that velocity imparted to the board by the drive 90. The V-rollers 92 in the V-roller drive are driven by a geared interconnection 93 with the motor drive 78 at a velocity greater than the velocity at which the nip rollers 64 are driven. Suitable for use as the motor 78 is a device manufactured by Bodine Electric Co., Chicago, Ill. and sold under model number 32D5BEPM-W4, catalogue number 156.

The V-roller drive 90 translates boards from the exit of the nip rollers 64 into abutting relationship with the trailing edge of a preceding board already engaged in the wetting rolls 82. Board overlap is prevented by the vertical dimension of the peripheral slot in the rollers 92 and by horizontally disposed plates 96 arranged to form slots which register with the slots in the rollers 92. The slots in the rollers 92 and those formed by the plates 96 (which engage the edges of the boards in the regions between V-rollers 92) prevent the occurrence of board overlap. A detector arrangement 98 is located upstream of the wetting rolls 82 to detect gaps between boards entering the wetting rolls 82. A gap (or nonabutting relationship) between boards is detected by the detector 98 and a signal generated thereby is applied to a motor control network 100 which results in an increased speed of rotation of the V-rollers 92 and also an increased speed of boards through the cleaning section 12. As a further result of the increase of board speed, there is an increase in the rate at which circuit boards CB are fed by the in-feed arrangement 18 (or an operator if the manual in-feed 18' is used) to the apparatus 10. The sensor 98 comprises a phototransmitter T and a photoreceiver R. In practice, the phototransmitter T is disposed below the pass line PL (FIG. 12) facing upwardly while the photoreceiver 98R is disposed above the pass line PL facing downwardly. Suitable for use as the phototransmitter T for the sensor pair 98 (and for each of the other sensor pairs 116, 118, 120 and 132 shown herein) is a device manufactured by Banner Engineering Corp., Minneapolis, Minn., and sold under model number LR400. The photoreceiver R for the pair 98 (and all other pairs) is a device sold by the same manufacturer under model number PT400. These devices are used with a modulating amplifier MB3-4 sold by the same manufacturer.

Still with reference to FIG. 1 the laminating section 16 is disposed between the wetting rolls 82 and the nose of wedges 102. In the laminating section 16 the upper and lower surfaces of the circuit board CB are provided with a layer of dry film photopolymer resist through the action of a pair of laminating rolls 104A and 104B. The laminating rolls 104 are driven by a motor 105.

A supply of photopolymer resist material for the upper and lower surfaces of the circuit boards is respectively stored on supply rolls 106A and 106B. The photopolymer resist material includes a web or film of the resist material itself supported on a substrate or backup strip of any suitable material. From the supply rolls 106 the resist material is trained over guide rolls 108 and into the gap between the laminating rolls 104. It is between the laminating rolls 104 that the film resist is adhered by the application of heat and pressure to the surface of the circuit board. The backup strip, now forming the outer layers of a sandwich which includes a laminate (formed of the circuit board and the resist material adhered thereto) extends through the apparatus 10 to and through the wedges 102. At the nose of the wedges 102 the backup strip diverges sharply and is peeled away from the resist material, leaving the laminated sandwich of the board having upper and lower layers of photopolymer resist material thereon.

The backup strip is taken-up by take-up rolls 110 each having a continuously slipping clutch tension device 111 associated therewith. The drive sprockets for the laminating rolls 104 and for the take-up rolls 110 are driven by the same motor 105. Due to a difference in the size of the drive sprockets, the speed of the drive sprockets for the take-up rolls 110 is greater than the speed of the drive sprocket for the laminating rolls 104. However, due to the provision of the continuously slipping clutch tensioning device 111, the mandrel of each of the take-up rolls is rotated at a lesser angular speed, thus controlling the tension force applied to the backup strip by the rolls 110.

An array of sensors 116, 118, and 120 are disposed at predetermined locations in the laminating section 16. Each sensor 98, 116, 118 and 120 comprise a phototransmitter and a photoreceiver R pair. The first sensor 116 is arranged to generate a signal to a control arrangement 124 when the leading edge of the first circuit board in the train of boards passing the sensor 116. This signal initiates operation of the drive motor 105 which drives the laminating rolls 104 and the take-up rolls 110. A signal from the second sensor 118 that the leading end of the first circuit board is moving therepast initiates the closing of the laminating rolls 104. The laminating rolls 104 close just as the leading edge of the first board enters the nip thereof. When the trailing edge of the last board passes the sensor 120 a signal is generated thereby representative of that fact and the laminating rolls 104 are opened. For clarity of illustration, only the photoreceivers R for the sensors 116, 118 and 120 are shown in FIG. 1.

A crank mechanism diagrammatically indicated at 121 facilitates the opening and closing of the laminating rolls 104.

As noted earlier the now-laminated circuit board (or "laminate") is advanced through the laminating section 16 downstream of the laminating rolls by the action of the take-up rolls 110. The take-up action of the rolls 110 draws the laminate through the pair of wedges 102 and at the wedges the backup strip diverges sharply toward the take-up rolls 110 and is thereby removed from the surface of the film which has been heat-laminated to the board. While any portion of the laminate is still within the apparatus the laminate is subjected to a restraining force which tends to resist any displacement force imposed on the laminate in the direction of arrow A.

As the laminate begins to emerge from the nose of the wedges 102 a detector 132 arrangement (identical with the detector 98) generates a signal to a control network 134 over a line 302. The speed at which the laminate leaves the wedges 102 is monitored by a shaft encoder 135 arranged proximal to the drive sprocket for the laminating rolls 104 and a signal provided on a line 308 to the control network 134. When a predetermined portion of the board is through the wedges 102, gripping elements 136 which form a part of a gripping arrangement 130 grasp the laminate on opposite sides thereof. Simultaneously a cylinder 138, also part of the gripping arrangement 130, is activated which applies a force acting in the direction 140 (parallel to the arrow A) drawing the gripping elements 136 and the laminate grasped thereby away from the wedges 102. However, so long as the laminate is engaged between the wedges 102 the displacement force exerted by the actuator 138 is insufficient to dislodge the laminate from the interior of the apparatus. Once the trailing edge of the laminate clears the wedges 102 the force exerted by the actuator 138 becomes dominant and the laminate jerks in the direction 140 and the laminate is lead onto rollers 142. Upon the imposition of an impulse force the resist severs along a tear line substantially coextensive with the trailing edge of the laminate.

The carriage on which the gripping elements are carried includes a magnet 144. A magnetic sensor switch 146 responds to the proximity of the magnet 144 thereto and provides a signal on a line 310 to the control network 134 that indicates that the gripping elements 136 have reached the end of travel. At the occurrence of the signal the gripping elements 136 release their grasp on the laminate and the actuator 138 is energized in an opposite direction returning the gripping elements 136 to their initial position to await the exit of the next successive laminate from the wedges 102. The laminates may now be manually or automatically stacked, or if desired, applied to other process steps.

With reference now to FIGS. 4 through 12 shown are illustrations of a conveyance arrangement including a roller drive in accordance with this invention adapted to convey circuit boards through the rinsing section 14 of the apparatus 10. The rinsing section 14 is that region of the apparatus 10 defined between the nip roller 64 and the wetting rolls 82.

The V-roller drive 90 in accordance with the invention includes a first and a second frame 152R and 152L, respectively, disposed on opposed sides of the vertical centerline VCL of the apparatus 10. The frames 152 thus lie on opposed sides of the path of travel of the boards CB. Cut out portions in the frames 152 are provided to accommodate certain elements, such as water nozzles, air knives, etc. (FIG. 1) which are omitted from FIGS. 4 through 12 for clarity. The cut-out portions serve to define arrays of columns 156R-1 through 156R-6 and 156L-1 through 156L-6 on the frames 152R and 152L, respectively.

The frames 152 are supported within the rinsing section 14 by transversely extending cross ties 158 and 160. The cross ties 158 and 160 are secured to the side walls of the apparatus 10 and form support beams for the frames 152.

Both the frames 152 are transversely movable on the cross ties 158 and 160 to vary the transverse dimension therebetween and thereby accommodate various board widths through the apparatus 10. To faciliate movement of the frames 152 with respect to the cross tie 158 the laterally confronting surfaces of each of the frames 152 in the vicinity of the first column (156R-1 and 156L-1, respectively) is provided with a bearing support 164 carrying upper bearings 166 and lower bearings 168 thereon. The bearings 166 and 168 vertically straddle the cross tie 158 to define a bearing surface on which the frames may traverse the tie 158.

To facilitate movement of the frames 152 with respect to the cross tie 160 the confronting lateral surfaces of the frames 152 are provided in the vicinity of the fifth column (156R-5 and 156L-5, respectively) with bearing supports 170. The ends of the supports 170 opposite from their points of attachment with the frames 152 carry a pair of downwardly depending bearings 172F and 172R cooperating to define an inverted "V" configuration. The bearings 172 grasp the cross tie 160 to form the bearing surfaces on which the frames move with respect to the cross tie 160. Each of the bearing supports 170 is adapted to receive a lock plate 174 (FIG. 4) which is secured by a lock nut 176. The lock plate 174 has a friction surface which, when brought to bear against the cross tie 160, effectively prevents transverse movement of the frame 152 with respect to the tie 160. A graduated scale 178 is disposed between the frame 152 on the tie 160 to assist the operator in accurately adjusting the transverse dimension between the frames 152. Baffles 85 are secured to the side walls of the apparatus 10 and extend across the interior of the apparatus to isolate the portion in which rinsing of the boards occur. The baffles overlap to permit adjustments to the transverse dimension of the frames 152.

As seen in FIG. 7, each of columns 156 has a central bore 180 extending therethrough. The diameter of the bores 180 in the frame 152L is greater the diameter of the bores in the frame 152R for a reason made clear herein. The central bores 180 each receive a rotatable shaft 181 which forms the axis 94 of rotation for each of the V-rollers 92 which depend from the lower surfaces of the columns 156 of the frames 152. The shafts 181 extending through the columns 156 in the frame 152R are supported at their upper and lower ends by bearings 182U and 182L, respectively. The bearings 182 are disposed in counterbores 184U and 184L, respectively. The shafts 181 extending through the columns 156 in the frame 152L are supported at their upper end by a self-aligning bearing 185 received within a counterbore 186. Suitable for use as the self-aligning bearing is a device sold by SKF Bearings Inc., King of Prussia, Pa., under model number SKF-1200. The lower end of the shafts 181 are provided with bushings 187 which are captured in transversely extending slots 188.

With reference to FIG. 10, a cross section of an individual V-roller 92 is shown. Although FIG. 10 is driven through a column in the frame 152R, the construction of a roller attached to the frame 152L identical in structure to the roller described in connection with FIG. 10. Each of the V-rollers 92 includes a flanged hub 189 which is keyed by a key 190 to the shaft 181. Received on the hub 189 (and keyed to the shaft 181) is an annular roller disk 191. The disk 191 is provided with an outer beveled surface 192 and a raised central portion 194 having a driving surface 194S thereon. The surface 194S of the central portion 194 defines an angle 195 with respect to the axis 94 of the roller. For a disk 194 having a driving surface formed of hard stainless steel, the angle 195 lies in the range from 30° to 60°. The preferred angle is 45°. The portion of the surface 191S of the disk 191 is tapered slightly from the base of the central portion 194 to the beveled surface 192. The taper angle is typically 2°.

A second annular disk 196 having a beveled outer surface 198 is keyed to the shaft 181. The disk 196 is received on the central portion 194. The disk 196 is counter-bored and receives a locking member 200 which, when secured by a lock nut 202, connects the disk 196 to the shaft 181. The portion 196S of the surface of the disk 196 tapers from the central opening toward the beveled surface 198 at the same angle as the taper of the surface 191S.

The surfaces 191S, 194S (on the central portion) and the surface 196S cooperate to define a peripheral slot 206 in the roller 92. The opposed beveled surfaces 192 and 198 cooperate to form a lead-in to the slot 206. The angularity of the surface 194S is critical in that this is the driving surface which (depending upon the restrained or unrestrained condition of the circuit boards) either transmits a force to the board urging it in a rectilinear direction at a predetermined velocity or slips against the edge of the board. The angle of the surface 194S is selected such that various thicknesses of boards may be accommodated.

As seen in FIG. 11, the edges of a circuit board engaged within the roller 92 are carried on the driving surface 194S on the central portion 194 and on the surface 196S on the disk 196. Different board thickness (shown as boards CB' and CB") result in the edges being carried at different points on the surfaces 194S and 196S. However, the operation of the roller 92 is not impeded so long as the edge of the board is engaged with the surface 194S.

The roller disks 191 (including the central portion 194 and the driving surface 194S thereon) and the roller disk 196 are fabricated of a hard steel material, such as stainless steel. Of course, other suitable hard materials may be used. The material selected must be of sufficient hardness to resist gouging which may arise from the edges of the boards carried thereby. If materials other than hard stainless steel are used, the angle that the surface defines with respect to the axis of rotation may be modified so that the surface may appropriate either impart a driving force to or slip with respect to the board, depending upon whether the board is unrestrained or restrained.

The taper of the surfaces 191S and 196S is provided for clearance between the upper and lower surfaces of the board and the surfaces 191S and 196S respectively. The vertical dimension H (FIG. 11) of the slot 206 is selected such that at all radial points of the rollers 92 there is insufficient clearance to receive another circuit board thereover. This condition serves to prevent board overlap.

Each of the opposed pairs of rollers 92 located at the bases of each of the columns 156 on each of the opposed frames 152 is driven co-currently such that tangents thereto (represented by arrows A', FIG. 4) extend in the same direction as the direction of travel of the board (arrow A) through the apparatus. Motive force for the rollers 92 is supplied from the motor 78 mounted on a bracket disposed on the exterior of the apparatus 10. The same motor 78 serves as a prime mover for the nip rollers in the cleaning section 12. The motor 78 is geared through an appropriate gear arrangement 93 (not shown in FIG. 4) to supply driving force to rotate the rollers 92 at a linear velocity in excess of the velocity of the nip rolls 64 and wetting rolls 82. For example, if the nip rollers 64 (and the wetting rolls 82) are driven at eight feet per minute (a typical speed) the rollers 92 are driven in the range of twelve to sixteen feet per minute.

Motive force for the rollers 92 depending from each of the frames is supplied from the motor 78 through a geared interconnection generally indicated at 93 (FIG. 1), the components of which are discussed herein, from the motor to a transversely extending splined shaft 210. The splines on the shaft 210 engage a driven sprocket 212 mounted on the exterior lateral surface of the frames 152. The rotative force is transmitted through the driven sprocket 212 to a reduction gear sprocket 214 engaged therewith. The sprocket 214 is connected to the shaft 216 of an angle gear box 218. Suitable for use as the angle gear box 128 is a device manufactured by Zeromax, Minneapolis, Minn., and sold under model number 139801. The shaft 216 extends through the frame 152 to the interior lateral surface thereof where the angle gear box 218 is connected thereto. The output shaft 220 of the gear box 218 drives a sprocket 221. The sprocket 221 is interconnected by a chain 222 to a drive sprocket 224 rotatably mounted in the frame 152. The drive sprocket 224 is accessible due to its disposition in a cut out portion 226 (FIGS. 5 and 6) provided in the frame 152 for that purpose. The shaft 228 from the sprocket 224 extends through a bore 229 in the frame and protrudes through the upper surface thereof where it is connected to a pulley 230. The pulley 230 is connected by an array of belts 232 to pulleys 234 mounted on the protruding upper ends of the shafts 182 on which the rollers 92 are mounted. The splines on the splined shaft 210 are selected to exhibit a transverse length such that the shaft remains engaged with the gears 210 on each frame throughout the full range of movement of the frames with respect to the cross ties. It is, of course, to be appreciated that any suitable arrangement may be utilized whereby the V-rollers are driven in co-current directions (arrows A', parallel to the direction of travel of the circuit boards shown by the arrow A).

The frames 152 are movable, as discussed above, to accommodate various width boards in the manner discussed above. However, slight variations among boards ostensibly of the same width are accommodated by the provision of an attachment bearing 236 disposed below the drive pulleys 234 and the top surface of the frame 152L. Suitable for use as the attachment bearing is a device sold by Stock Drive Products, a Division of Designatronics, Inc., New Hyde Park, N.Y., sold under model number SDF-7Y55-FSS-8737. Each bearing 236 is connected to a spring 238 which imparts an outwardly directed bias (in the direction of the arrow 240) which slightly cants the shafts 181 (by an angle 241 in the range from 0° to 5°) and displaces the rollers 92 inwardly toward the rollers 92 on the other frame 152R. Thus, the rollers 92 on the frame 152L are biased toward the other frame 152R but may be slightly deflected to accommodate slight variations in the width of boards. The tension in the springs 238 is adjustable by the provision of threaded knobs 241 mounted on threaded members 242.

Pairs of opposed plates 244A and 244B and 246A and 246B respectively depend from the lower surface of the frames 152R and 152L. The plates 244 cooperate to define a slot 248R which registers with the slots 260R formed in the periphery of the rollers 92 depending from the frame 152R. Similarly, the plates 246 cooperate to form a slot 248L which register with the slots formed in the periphery of the rollers 92 depending from the frame 152L. The plates act as guides for the boards CB as the boards are displaced through the areas intermediate adjacent rollers 92. The dimension of the slots 248 is adjustable by the adjustment arrangement 249 (FIG. 6).

The plates 244 are mounted to the undersurface of mounting blocks 250 and 252 which are secured to the exterior lateral surface of the frame 152R in the vicinity of the first and fourth columns (156R-1 and 156R-4), respectively. The plates 246 are connected to the frame 156L by mounting blocks 254 and 256 disposed on the frame 156L in a similar manner. The plates 244 and 246 have cut out portions 257 (FIG. 9) formed therein to permit the plates to surround the rollers 92.

Positioned near the wetting rolls 82 is the detector arrangement 98. As noted earlier, the detector 98 includes a phototransmitter 98T and an associated photoreceiver 98R. The photoreceiver 98R is mounted to an arm 264 (FIG. 12) supported through swivel joints 268 and 270 above the pass line PL from the interior surface of the frame 152R. The phototransmitter 98T is supported from an arm 274 mounted through a swivel joint 276 to a bracket 278 attached to the exterior surface of the frame 152R. By placing the receiver 98R facing downwardly, the possibility of stray light triggering the control 100 through the detector arrangement 98 is minimized. The arms 264 and 274 are adjustable in a range from 0° to 20°. The phototransmitter 98T is oriented at a predetermined angle of 150 degrees with the vertical. The orientation of the phototransmitter and photoreceiver are such that spurious signals are not generated should a beam of light pass between holes provided in the circuit boards. The detector arrangement 98 provides an indication of a gap between the trailing edge of a preceding board already engaged between the wetting rollers 82 and the leading edge of a board being conveyed through the rinse and air-dry section. Although FIG. 12 illustrates the detector arrangement 98 as supported from the frame 152R, the detector arrangement 98 may be supported from the frame 152L with equal facility.

In operation a circuit board is conveyed from the cleaning section 12 through the exit nip rollers 64 and is progressively engaged by opposed pairs of V-rollers 92. So long as the board is engaged by the nip rollers 64 the rollers 92 slip along their driving surfaces 194S with respect to the edges of the board. However, when the trailing edge of the board becomes free of the nip rollers 64 the V-rollers 92 translate the board in the direction of the arrow A along the pass line at a rectilinear velocity in excess of velocity of the board through the nip rollers and urge the board toward the wetting rolls 82. The board is guided by the action of the slot 206 formed in the rollers 92 and by the action of the slots 248 formed in the guide plates and is brought into an abutting relationship with any preceding board already engaged in the wetting rolls. If a gap is defined between the trailing edge of a preceding board and the leading edge of a given circuit board a signal is generated from the photodetector arrangement 98 to the motor control 100 causes an increase in speed of rotation of the V-rollers.

Those skilled in the art having the benefit of the teachings of the instant invention may recognize various modifications thereto. For example, V-rollers in accordance with this invention may be advantageously provided from only one of the frames, with idler rollers (with or without slots) being disposed on the other of the frames. Further, depending upon the material used to fabricate the individual rollers and the driving surface thereon, the magnitude of the driving surface angle with respect to the axis of rotation of the roller may vary outside the ranges set forth in connection with the preferred embodiment of the invention. However, it is to be understood that these and any other modifications are to be construed as lying within the scope of the instant invention, as defined in the appended claims.

What is claimed is:

1. Apparatus for conveying a planar member having a predetermined edge thickness comprising:
    a roller having a peripheral slot tapering to a driving surface, the surface exhibiting a predetermined angle with respect to an axis of rotation of the roller, the driving surface being tapered to a greater extent than the taper of the slot to engage an edge of each article to be conveyed; and
    means for rotating the roller about the axis of rotation, the angle of the surface being arranged such that when the member is restrained the roller slips along the driving surface with respect to the member and that when the member is unrestrained the driving surface engages the member to displace the member at a predetermined velocity.

2. Apparatus according to claim 1 wherein the angle lies in the range from 30° to 60°.

3. Apparatus according to claim 2 wherein the angle is 45°.

4. Apparatus according to claims 1, 2, or 3 wherein the driving surface is fabricated of hard stainless steel.

5. A roller for use in an apparatus for conveying a planar member, the roller having a peripheral slot tapering to a driving surface, the surface exhibiting a predetermined angle with respect to the roller axis and being tapered to a greater extent than the taper of the slot to engage an edge of each article to be conveyed, the angle of the surface being arranged such that when the roller is rotated the surface slips with respect to the edge of a restrained member engaged thereby yet displaces the member when the member is unrestrained.

6. The roller according to claim 5 wherein the angle lies in the range from 30° to 60°.

7. The roller according to claim 6 wherein the angle is 45°.

8. The roller according to claims 5, 6 or 7 wherein the driving surface is fabricated of hard stainless steel.

9. Apparatus for conveying a planar member having a predetermined edge thickness along a path of travel through a region defined between an inlet and an outlet, the apparatus comprising:
    a first and a second roller each disposed on opposite sides of the path of travel, each roller being adapted to engage the planar member, the first roller having a slot terminating in a driving surface, the driving surface exhibiting a predetermined angle with respect to the roller axis;
    means for rotating the first roller at a predetermined rotational speed, the angle of the driving surface being arranged such that when the planar member is unrestrained the driving surface of the roller engages the edges of the planar member to rectilinearly displace it from the inlet to the outlet of the region at a first rectilinear speed and that when the planar member is restrained the driving surface of the roller slips relative to the edge of the planar member; and
    a slotted guide disposed adjacent to the first roller, the slot in the guide being registered with the slot in the roller.

10. Apparatus according to claim 9 further comprising
    a detector adapted to generate a signal representative of a gap between the trailing edge of a member leaving the region and the leading edge of a member in the region; and
    means responsive to the signal for increasing the rotational speed of the roller.

11. Apparatus according to claims 9 or 10 wherein the angle of the driving surface lies in the range from 30° to 60°.

12. Apparatus according to claim 11 wherein the angle is 45°.

13. Apparatus according to claim 12 wherein the driving surface is fabricated of hard stainless steel.

14. Apparatus according to claim 11 wherein the driving surface is fabricated of hard stainless steel.

15. Apparatus for conveying a planar member having a predetermined edge thickness and a predetermined width dimension through a region defined between an inlet and an outlet, the apparatus comprising:
    a first and a second frame respectively disposed on opposite sides of the path of travel;
    a first and a second roller respectively mounted for rotation on the first and second frame, each roller having a slot terminating in a driving surface, each driving surface exhibiting a predetermined angle with respect to the axis of rotation of the roller on which it is disposed;

means for rotating the first and second rollers co-currently at a predetermined rotational speed, the angle on each surface being arranged such that when the planar member is restrained the driving surface of each roller engages the edge of the planar member to rectilinearly displace it from the inlet to the outlet of the region at a first rectilinear speed and that when the planar member is restrained the driving surface of each roller slips relative to the edge of the planar member; and a slotted guide mounted to each frame adjacent to the roller mounted thereon, the slot in each guide being registered with the slot in the roller to which it is adjacent.

16. Apparatus according to claim 15 further comprising:

a detector adapted to generate a signal representative of a gap between the trailing edge of a member leaving the region and the leading edge of a member in the region; and means responsive to the signal for increasing the rotational speed of the roller.

17. Apparatus according to claim 15 further comprising:

a detector adapted to generate a signal representative of a gap between the trailing edge of a member leaving the region and the leading edge of a member in the region; and, means responsive to the signal for increasing the rotational speed of the rollers.

18. Apparatus according to claims 16 or 17 wherein the detector comprises:

a photosource mounted to one frame and disposed above the path of travel; and a photodetector mounted to the same frame and disposed below the path of travel.

19. Apparatus according to claims 15, 16 or 17 wherein the angle of the driving surface of each roller lies in the range from 30° to 60°.

20. Apparatus according to claim 19 wherein the angle of the driving surface of each roller is 45°.

21. Apparatus according to claim 20 wherein the driving surface on each roller is fabricated of hard stainless steel.

22. Apparatus according to claim 19 wherein the driving surface on each roller is fabricated of hard stainless steel.

* * * * *